A. J. DAVIS.
Fly-Traps.
No. 141,495.
Patented August 5, 1873.
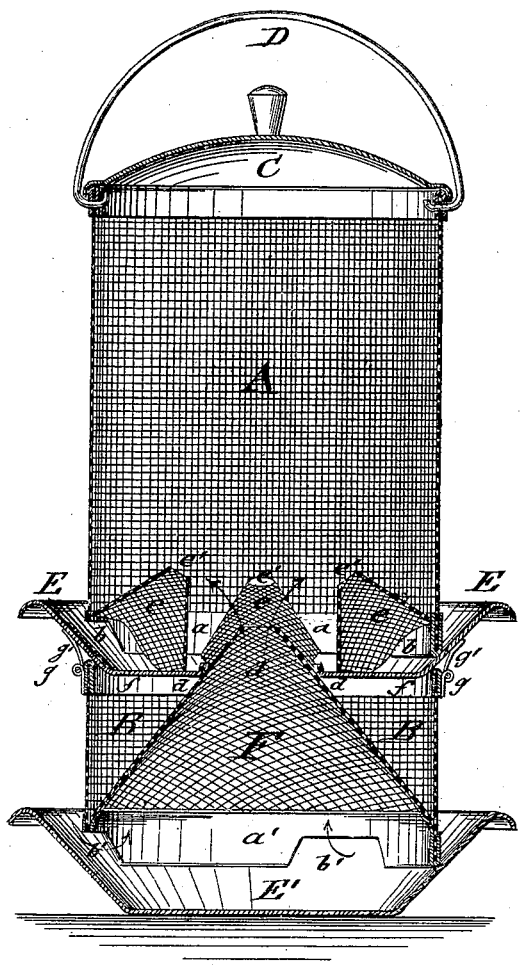
Witnesses:
Inventor:
A. J. Davis
Per
Attorneys.

UNITED STATES PATENT OFFICE.

ANDREW J. DAVIS, OF HARTFORD, MICHIGAN.

IMPROVEMENT IN FLY-TRAPS.

Specification forming part of Letters Patent No. 141,495, dated August 5, 1873; application filed June 21, 1873.

*To all whom it may concern:*

Be it known that I, ANDREW J. DAVIS, of Hartford, in the county of Van Buren and State of Michigan, have invented a new and Improved Fly-Trap, of which the following is a specification:

In the accompanying drawing, Figure 1 represents a vertical section of my improved fly-trap.

The object of my invention is to furnish to the public an effective and simple fly-trap by which the flies are caught rapidly and killed easily therein. My invention consists in the arrangement of an upper cage with cones for the entering of the flies, which cage is connected to a lower chamber with one cone leading into the upper cage, forming a double-acting trap.

A in the drawing represents the upper, B the lower, chamber of the trap, of cylindrical shape, and of suitable wire-gauze. The upper chamber or cage A has a cover, C, and a bail or handle, D. The cage A rests, by means of a lower rim, $a$, with entrance-openings $b$ for the flies, on a basin, E, which is provided with a central circular aperture, $d$. To the basin E are soldered, or otherwise connected around the inner sides of the entrances $b$, the cones $e$ of wire-gauze, which have small openings $e'$ at their apexes, through which the flies pass up into cage A after having been attracted by suitable bait into cones $e$. The basin E fits on the lower chamber B, and is connected to the upper rim $f$ of the same by sliding bolts $g$ of rim $f$ and eyes or staples $g'$ of basin B. The lower rim $a'$ of chamber B is, in similar manner as that of cage A, provided with entrance-openings $b'$ and a basin, E'. One large cone, F, having the same diameter as chamber B, is connected to rim $a'$ above openings $b'$, and extends up into cage A through aperture $d$ of basin E. Its apex has also a small entrance hole for the exit of the flies from the lower chamber B.

The flies which have entered in search of food through entrances $b$ $b'$ follow the light, and pass up through the lower and upper cones into cage A, without being able to return.

When the cage A is filled with flies the upper part is dipped into hot water, and the flies are then emptied out on taking off cover C.

By detaching the cage from the lower chamber the bait may easily be put into the lower chamber and through the top into the upper cones.

The double trap which is formed by the upper and lower chambers, together with the numerous entrances for the flies, allows the entering of many of them at the same time, and catches them rapidly therein.

Having thus described my invention, I claim as new and desire to secure by Letters Patent—

1. The double fly-trap, consisting of cage A, with cover C, handle D, entrance-cones $e$, and basin E, connected to the lower chamber B, having cone F and basin E', substantially as specified.

2. The basin E, having central aperture for lower cone F resting on the rim $f$ of lower chamber B, and secured thereto by sliding bolts $g$ and eyes $g'$, as shown and described.

ANDREW J. DAVIS.

Witnesses:
    JONATHAN C. ROBINSON,
    MALVINA S. ROBINSON.